US009904698B2

United States Patent
Hollins et al.

(10) Patent No.: US 9,904,698 B2
(45) Date of Patent: Feb. 27, 2018

(54) SPORTS PERFORMANCE TESTING AND TRAINING SYSTEMS, DEVICES AND METHODS

(71) Applicants: Jamie Lee Hollins, Toronto (CA); Jonathon Gale Hollins, Pickering (CA); Renato Cianciusi, Toronto (CA); Gagandeep Singh, Toronto (CA); Martin Cooper, Toronto (CA); Omer Elbi, Toronto (CA); Haluk Turkvan, Toronto (CA)

(72) Inventors: Jamie Lee Hollins, Toronto (CA); Jonathon Gale Hollins, Pickering (CA); Renato Cianciusi, Toronto (CA); Gagandeep Singh, Toronto (CA); Martin Cooper, Toronto (CA); Omer Elbi, Toronto (CA); Haluk Turkvan, Toronto (CA)

(73) Assignee: Sport Testing Inc., Toronto (CA)

( * ) Notice: Subject to any disclaimer, the term of this patent is extended or adjusted under 35 U.S.C. 154(b) by 303 days.

(21) Appl. No.: 14/609,479

(22) Filed: Jan. 30, 2015

(65) Prior Publication Data
US 2016/0220864 A1 Aug. 4, 2016

(51) Int. Cl.
*A63F 13/00* (2014.01)
*G06F 17/30* (2006.01)
(Continued)

(52) U.S. Cl.
CPC ... *G06F 17/30312* (2013.01); *G06Q 10/0639* (2013.01); *G06Q 50/01* (2013.01);
(Continued)

(58) Field of Classification Search
CPC .............................. A61B 5/0002; A61B 5/6814
See application file for complete search history.

(56) References Cited

U.S. PATENT DOCUMENTS

| 4,645,458 A | 2/1987 | Williams |
| 4,751,642 A | 6/1988 | Silva et al. |

(Continued)

OTHER PUBLICATIONS

Office Action issued by the Canadian Patent Office dated Jun. 1, 2016. Canadian Application No. 2,880,538.

*Primary Examiner* — Reginald Renwick
(74) *Attorney, Agent, or Firm* — Antonio Papageorgiou; Meister Seelig & Fein LLP

(57) ABSTRACT

A method for collecting performance test data during a performance test of an athlete from timing devices associated with a performance test includes automatically receiving an electronic time stamp message from each of the timing devices, each electronic time stamp message incorporating a time stamp generated by the timing device in response to entering into a triggered state during the performance test; and automatically inserting time data corresponding to the received time stamps into respective fields of an electronic performance test record associated with the unique athlete identifier. A system for collecting performance test data includes a plurality of timing devices each configured to generate one or more electronic time stamp messages each incorporating a time stamp generated in response to entering into a triggered state during a performance test; a synchronizing device configured to periodically transmit electronic synchronize instructions to the timing devices to synchronize the timing devices; and a control device configured to receive the electronic time stamp messages from the timing devices and to insert time data corresponding to the time stamps into respective fields of performance test records.

25 Claims, 9 Drawing Sheets

(51) Int. Cl.
    *H04Q 9/00* (2006.01)
    *H04Q 9/04* (2006.01)
    *G06Q 10/06* (2012.01)
    *G06Q 50/00* (2012.01)
    *G07C 1/22* (2006.01)
    *G09B 19/00* (2006.01)

(52) U.S. Cl.
    CPC ............ *G07C 1/22* (2013.01); *G09B 19/0038* (2013.01); *H04Q 9/00* (2013.01); *H04Q 9/04* (2013.01); *H04Q 2209/47* (2013.01)

(56) References Cited

U.S. PATENT DOCUMENTS

| | | |
|---|---|---|
| 5,901,961 A | 5/1999 | Holland, III |
| 6,013,007 A | 1/2000 | Root et al. |
| 6,072,751 A | 6/2000 | Kirson et al. |
| 6,749,432 B2 | 6/2004 | French et al. |
| 2006/0160662 A1 | 7/2006 | Munnia |
| 2007/0213126 A1 | 9/2007 | Deutsch et al. |
| 2007/0219059 A1* | 9/2007 | Schwartz ............ A61B 5/0205 482/8 |
| 2012/0053016 A1* | 3/2012 | Williamson ....... A63B 24/0062 482/8 |
| 2012/0170427 A1 | 7/2012 | Saunders et al. |
| 2014/0184207 A1 | 7/2014 | Rosenmoeller |
| 2016/0160662 A1 | 6/2016 | Snyder |

* cited by examiner

SPORTS PERFORMANCE TESTING AND TRAINING SYSTEMS, DEVICES AND METHODS

FIELD OF THE INVENTION

This following relates generally to sports, and more particularly to sports performance testing and training systems, devices and methods.

BACKGROUND OF THE INVENTION

The training and testing of athletes for sports involves observations of performance in a number of areas such as: speed, acceleration, agility, endurance, speed endurance, power, balance and coordination. For example, testing athletes for football may involve devising and executing tests such as 40-yard dash, 3-cone drill, shuttle run, broad jump and vertical jump for measuring athletes' speed, explosion, ability to change direction, lateral quickness, power and so forth Similarly, testing athletes for hockey may involve devising and executing tests for measuring forward skating quickness, forward skating speed, backwards skating quickness, backwards skating speed, forwards and backwards puck handling, agility and so forth. It is desirable to compare results from such tests to compare athletes to other athletes, to determine athletes' own performance improvements over time, and to set goals.

Many tests for athletic performance, particularly those involving speed and agility, involve tracking elapsed time as the athlete makes his or her way through a devised test course. In the past, tracking performance of athletes during such tests involved manual observations of elapsed time by multiple personnel each equipped with a stopwatch and located at various positions throughout a field, track or ice pad during an event. An element of subjectivity as to precisely when a performance test begun, when it ended, and when the athlete reached certain waypoints was almost inevitable due to the human element. In addition, transcription errors were possible as each person capturing an elapsed time might write down their respective captured elapsed time after the performance test onto a table on a clipboard, or might manually type the captured elapsed time into a computer spreadsheet, before preparing to capture elapsed time for a subsequent athlete. Still further, amalgamating all of the disparate data captured by the various personnel by compiling all elapsed times into a master table or master spreadsheet would take significant amounts of time, sometimes days or weeks. The amalgamating process itself would also introduce risks of further transcription errors.

Improved systems and methods have been since devised. One method includes using a system including an electronic control unit for signaling the start of the race, and electronic intermediate and finish line units for gathering timing information for split time and finish times for tests such as races. While the use of such systems can improve the consistency and integrity of results, the systems themselves are capable of introducing problems. For example, the clocks incorporated into electronic intermediate and finish line units can each suffer from time drifts over longer periods of use. Such time drifts can contribute to significant skew in performance test results across athletes due to increasing clock time disparities between a start line unit and intermediate and finish line units, particularly when a given event such as a combines event lasts several hours or days. For example, an athlete being performance tested early on the first day of the event can have performance test results that differ in important ways from performance results taken from the same athlete at the end of the day, due simply to clock time drift of the devices being used to capture elapsed times on the performance tests. As a result, the performance tests lose integrity. This is highly undesirable particularly when the administrators of a league wish to compare performance test results of various athletes that were captured on different days, in different years, at different times of the day, and so forth.

It has been proposed to have remote timing units transmit a wireless electronic message to a controller when triggered, such that only one clock at the controller generates multiple time stamps, each being generated upon receipt at the controller of a respective wireless electronic message. While using a single clock may provide potential reduction in clock time drift problems, such a scheme introduces other problems by incorporating the communication channel into the timing chain. Any communication channel, and particularly a wireless communication channel, suffers from noise and the risk of collisions, which challenges can delay and even prevent receipt by the controller of such a wireless electronic message. Such delays or prevention of receipt of the wireless electronic messages by the controller results in time stamp information that is not truly reflective of the performance of the athlete during the performance test.

Particularly in professional and college sports, the accuracy of performance data captured during tryouts, combines events and the like is extremely important. This is because draft prospects, compensation rates, admissions and livelihoods hinge heavily on the captured performance data and how it compares with the performance data of other athletes. Therefore, while collecting sports performance data suitable for such high-stakes decision-making and valid comparisons across athletes, events and tests, it is desirable to reduce or eliminate any impacts of data capture error, whether caused by a human or by a machine.

In addition to the desirability of accuracy, it is desirable to have the captured performance data immediately available for various uses. One such use might be the making of performance data immediately available for display on scoreboards during performance testing events, in order to bolster engagement of both athlete and spectator, and to increase opportunities for onsite advertising. Another use might be the packaging of some or all of the captured performance data into real-time electronic data feeds accessible to sponsors, broadcasters, analysts, fans and the athletes themselves. Such feeds would be very useful for accompanying advertising and marketing information handled by producers of television, online and mobile content. For the athletes in particular, such a feed would be useful for supporting operation of social media portals directed to the athletes' performance statistics and latest news, as well as comparisons with other athletes based on age, level, field position and other metrics.

SUMMARY OF THE INVENTION

In accordance with an aspect, there is provided a method for collecting performance test data during a performance test of an athlete from timing devices associated with a performance test, the method comprising automatically receiving an electronic time stamp message from each of the timing devices, each electronic time stamp message incorporating a time stamp generated by the timing device in response to entering into a triggered state during the performance test; and automatically inserting time data corresponding to the received time stamps into respective fields of an electronic performance test record associated with the unique athlete identifier.

In an embodiment, each electronic time stamp message incorporates a unique timing device identifier, and each timing device identifier is associated with a respective field in the performance test record in accordance with a performance test protocol.

In an embodiment, each performance test protocol comprises data representing layout information for physical locations of the timing devices, and route information relating to a sequence of triggering of the timing devices.

In an embodiment, the time data comprises the received time stamps.

In an embodiment, the method comprises processing the received time stamps to generate the time data.

In an embodiment, the processing comprises generating the time data as elapsed times by subtracting a time stamp corresponding to the start time of the performance test from the other time stamps.

In an embodiment, the method comprises creating the performance test record and associating the performance test record with the unique athlete identifier in advance of receiving the electronic initiation message.

In an embodiment, the method comprises prior to creating the performance test record, receiving the unique athlete identifier from an athlete registration device; and associating the performance test record with an athlete information record associated with the unique athlete identifier.

In an embodiment, the method comprises receiving and storing one or more performance test protocol records from a remote computing subsystem; and creating the performance test record in accordance with a selected one of the one or more performance test protocol records.

In an embodiment, the method comprises periodically transmitting electronic synchronize instructions to the timing devices to synchronize clocks of the timing devices.

In an embodiment, the method comprises prior to automatically receiving an electronic time stamp, automatically transmitting an electronic reset instruction to timing devices associated with the performance test thereby to cause the timing devices to enter a wait state.

In an embodiment, the method comprises prior to automatically transmitting an electronic reset instruction, receiving an electronic initiation message from an athlete identifier scanner associated with a performance test, the electronic initiation message incorporating an unique athlete identifier corresponding to the athlete accepted by the athlete identifier scanner.

In an embodiment, the method comprises after receiving the electronic initiation message, receiving one or more additional electronic initiation messages and, in response, automatically transmitting an additional respective electronic reset instruction.

In an embodiment, the method comprises in response to user-initiation, transmitting an electronic reset instruction to the timing devices associated with the performance test.

In an embodiment, the method comprises transferring the performance test record for storage at a remote computing subsystem.

In accordance with another aspect, there is provided a system for collecting performance test data, the system comprising a plurality of timing devices each configured to generate one or more electronic time stamp messages each incorporating a time stamp generated in response to entering into a triggered state during a performance test; a synchronizing device configured to periodically transmit electronic synchronize instructions to the timing devices to synchronize the timing devices; and a control device configured to receive the electronic time stamp messages from the timing devices and to insert time data corresponding to the time stamps into respective fields of performance test records.

In an embodiment, the system comprises a remote computing subsystem configured to receive and store performance test records from the control device.

In an embodiment, the remote computing subsystem is configured to process the performance test records to generate report data.

In an embodiment, the report data is at least one of: test scores, comparison data.

In an embodiment, the remote computing subsystem incorporates computer readable memory storing computer readable program code for providing user access to the report data.

In an embodiment, the remote computing subsystem incorporates computer readable memory storing computer readable program code for permitting authorized users to create and/or modify performance test protocols.

In an embodiment, the control device is configured to store performance test protocols received from the remote computing device, wherein performance test records are structured according to respective performance test protocols.

In an embodiment, the synchronizing device is incorporated into the control device.

In an embodiment, the synchronizing device is incorporated into one or more of the timing devices.

In an embodiment, the synchronizing device is configured to wirelessly transmit the electronic synchronize instructions.

In an embodiment, the synchronize device is configured to wirelessly broadcast the electronic synchronize instructions.

In an embodiment, the synchronizing device comprises a clock designated as master clock, and the electronic synchronize instructions each incorporate the time of a master clock at the time of their transmission.

In an embodiment, the electronic synchronize instructions instruct the plurality of timing devices to set their respective clock to an elapsed time of 0.

In an embodiment, the synchronizing device is configured to transmit the electronic synchronize instruction about every 30 seconds.

In an embodiment, the timing devices prioritize generating the one or more electronic time stamp messages over handling of the synchronize instructions.

In an embodiment, the system comprises a display device in communication with the control device for displaying information based on the performance test records.

In an embodiment, at least one of the timing devices further comprises a stimulus component for providing one or more stimuli during a performance test.

In an embodiment, the stimulus component provides one or more of a visible stimulus; an audible stimulus.

In an embodiment the remote computing subsystem comprises computer readable memory storing computer readable program code for providing a protocol development suite for developing or modifying performance test protocols.

In an embodiment, each timing device comprises a clock, the time stamps being generated from a respective clock.

In an embodiment, each of the timing devices comprises computer readable memory storing a unique timing device identifier, wherein each electronic time stamp message from the timing devices incorporates the unique timing device identifier.

In an embodiment, at least one of the timing devices comprises an emitter for emitting a beam of optical radiation; and a receiver for registering receipt of a beam of optical radiation, wherein a reflector reflects a beam of optical radiation emitted by the emitter towards the receiver.

In an embodiment, the receiver comprises a photocell.

In an embodiment, at least one of the timing devices is configured to be in a wait state while the beam of optical radiation is being received at the receiver, and is configured to enter the triggered state in the event that the beam of optical radiation is broken.

In an embodiment, at least one of the timing devices is configured to be in a wait state while the beam of optical radiation is not being received at the receiver, and is configured to enter the triggered state in the event that the beam of optical radiation is received at the receiver.

In an embodiment, the controller is in wireless communication with the timing devices.

In an embodiment, the synchronizing device is in wireless communication with the timing devices.

In an embodiment, the control device is configured to store the performance test records in an electronic datastore.

In an embodiment, the performance test records in the electronic datastore comprise timing fields and the time data are inserted into respective timing fields in the datastore based on the unique timing device identifier incorporated in the respective electronic message.

In an embodiment, the control device is configured to transmit an electronic reset instruction to the timing devices thereby to cause the timing devices to leave the triggered state and enter into a wait state.

In an embodiment, the control device is configured to automatically transmit the electronic reset instruction after inserting the time data into respective fields of the performance test records.

In an embodiment, the control device is configured to permit a user to cause transmission of the electronic reset instruction.

In an embodiment, the system further comprises an athlete identifier scanner associated with the performance test and configured to accept unique athlete identifiers and to transmit electronic initiation messages each incorporating a unique athlete identifier to the control device.

In an embodiment, the athlete identifier scanner is configured to accept one or more additional unique athlete identifiers after transmitting an electronic initiation message and in response to transmit additional respective electronic initiation messages.

In an embodiment, the control device is configured to transmit an electronic reset instruction to the timing devices in response to receiving an electronic initiation message thereby to cause the timing devices to be in a wait state.

In an embodiment, the control device is configured to insert the time data corresponding to the time stamps into respective fields of performance test records that are associated with an unique athlete identifier.

In an embodiment, the system comprises an athlete registration device associated with the control device and configured to accept the unique athlete identifier and to transmit electronic registration messages each incorporating a unique athlete identifier to the control device upon athlete registration, wherein the control device is configured to associate performance test records with an athlete information record associated with a unique athlete identifier.

In an embodiment, the control device is configured to create athlete information records.

In an embodiment, the control device is configured to receive athlete information records from a remote computing subsystem.

In accordance with another aspect, there is provided a timing device for a performance test system, the timing device comprising a trigger subsystem; a clock; processing structure associated with the trigger subsystem entering into a triggered state and generating one or more electronic time stamp messages each incorporating a time stamp of the clock in response to the trigger subsystem detecting a trigger condition; and a communication subsystem responsive to the processing structure for transmitting the one or more electronic time stamp messages.

In an embodiment, the trigger subsystem is an optical-type trigger subsystem.

In an embodiment, the optical-type trigger subsystem comprises an emitter for emitting a beam of optical radiation; and a receiver for registering receipt of a beam of optical radiation, wherein a reflector reflects a beam of optical radiation emitted by the emitter towards the receiver across a path to be traversed by an athlete during a performance test.

In an embodiment, the processing structure is configured to periodically transmit electronic synchronize instructions to synchronize devices in the performance test system to the clock.

In an embodiment, the processing structure is configured to receive periodic electronic synchronize instructions and to, in response, synchronize the clock in accordance with the instructions.

In an embodiment, the communication subsystem transmits the one or more electronic time stamp messages according to the ZigBee standard.

In an embodiment, the electronic synchronize instructions are communicated using the communication subsystem according to the ZigBee standard.

In an embodiment, the trigger subsystem is configured to transition from a wait state to the triggered state in response to an initial break in receipt of the beam of optical radiation by the receiver.

In an embodiment, the processing structure is configured to discern between individual breaks in a succession of breaks in receipt of the beam of optical radiation.

In an embodiment, the processing structure is configured to establish the time stamp using the start time of the longest-lasting of the individual breaks in the event of a succession of breaks in receipt of the beam of optical radiation.

In accordance with another aspect, there is provided a method on a master device for synchronizing the master device and slave devices in a system for collecting performance test data, the method comprising on a periodic basis, automatically: transmitting a silence command to a network coordinator to delay transmission of network communications by the network coordinator; transmitting a silence command to the devices to be synchronized to delay transmissions of network communications by the devices; while the transmissions of network communications are being delayed, broadcasting a synchronize command incorporating a time stamp captured from a master device clock for receipt by the devices; with the synchronize command having been broadcasted, transmitting a resume command to the network coordinator to resume transmission of any delayed network communications; and re-setting the master device clock to the time stamp time.

In an embodiment, the periodic basis is every 30 seconds.

In an embodiment, the method further comprises delaying a first threshold amount of time between transmitting a silence command to the devices to be synchronized and broadcasting the synchronize command.

In an embodiment, the method comprises delaying a second threshold amount of time between broadcasting the synchronize command and transmitting the resume command.

In an embodiment, the first threshold amount of time and the second threshold amount of time are equal.

In an embodiment, the first threshold amount of time and the second threshold amount of time are 20 milliseconds.

BRIEF DESCRIPTION OF THE DRAWINGS

Embodiments of the invention will now be described with reference to the appended drawings in which.

DETAILED DESCRIPTION

Figure 1:
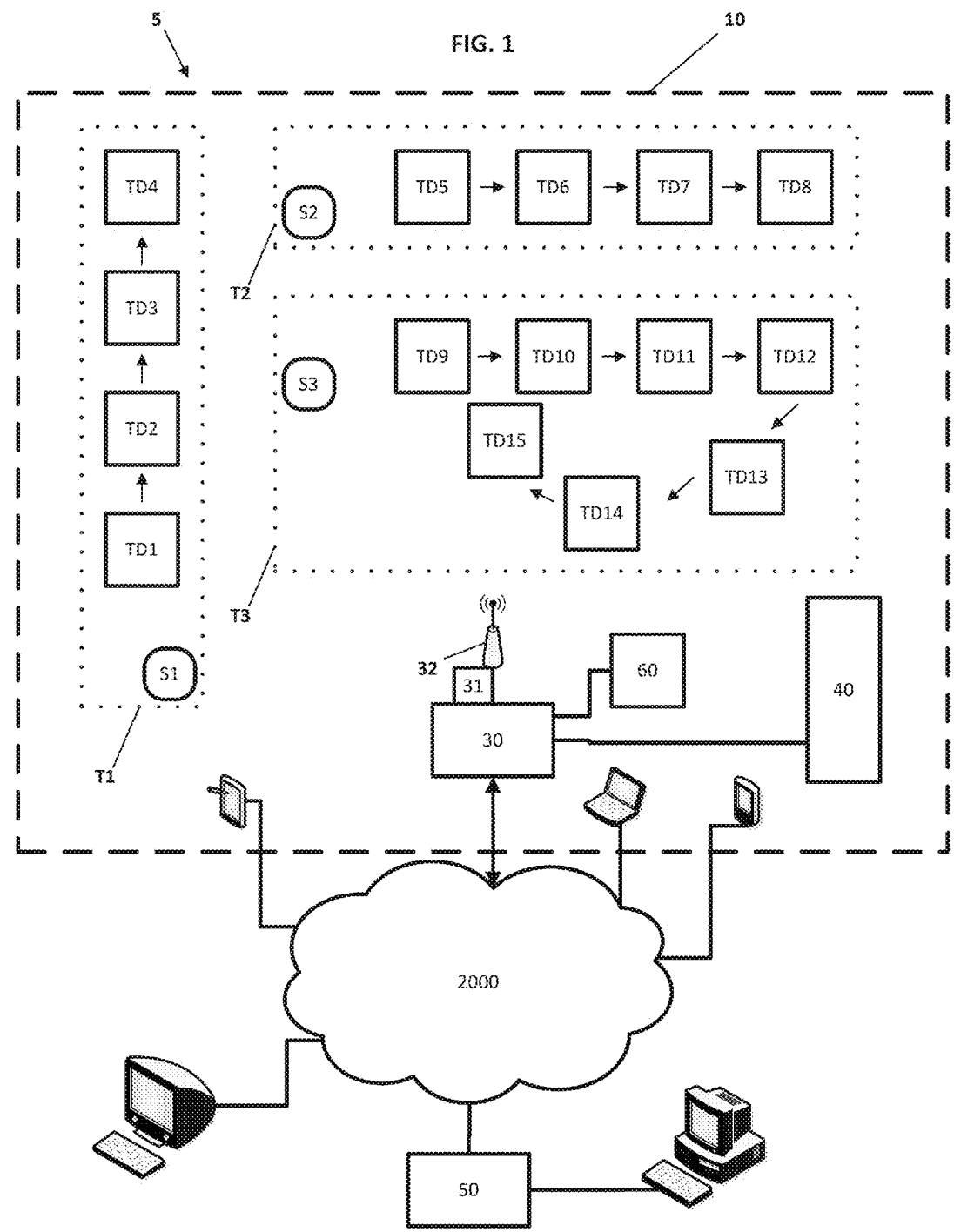
FIG. 1 is a schematic diagram of a system for collecting performance test data, according to an embodiment.

FIG. 1 is a schematic diagram of a system 5 for collecting performance test data according to an embodiment. In this embodiment, system 5 includes a local subsystem 10 with components that are physically located at a performance test location, such as for example a football field, and a remote subsystem 50 configured to electronically communicate with the local subsystem 10 via a communications network 2000, such as the Internet. Remote subsystem 50 also communicates with other local subsystems (which are not shown in the figures), that may be physically located at other performance test locations, in order to send and receive performance test-related information for various sports between multiple local subsystems simultaneously. During a performance testing event such as a football combine, however, local subsystem 10 does not need to have any data connection to remote subsystem 50 in order to conduct performance tests and to collect the results as will be described. In one example, local subsystem 10 is entirely self-contained during a performance testing event, such that only after the performance testing event is complete are one or more components of local subsystem 10 interconnected with remote subsystem 50 to upload performance test results gathered during the performance testing event to remote subsystem 50.

In this embodiment, local subsystem 10 includes a plurality of timing devices TD1 through TD15. In this embodiment, each of timing devices TD1 through TD15 is a timing gate that is configured to generate one or more electronic time stamp messages each incorporating a time stamp upon detecting a trigger condition during a performance test. In this embodiment, one of the timing devices, for example TD1, is designated also as a synchronizing device and is configured to periodically transmit electronic synchronize instructions to the other timing devices TD2 through TD15, as well as other system devices within the vicinity of local subsystem 10 in which the performance tests are to be conducted, in order to ensure that timing devices TD1 through TD15 and such other system devices remain synchronized with each other. A control device 30 is configured to receive the electronic time stamp messages from the timing devices TD1 to TD15 via antenna 32, and to insert time data corresponding to the time stamps into respective fields of performance test records that are stored within the control device 30. Other performance measurement devices for measuring athletes' jump heights, jump distances, strength and so forth may be integrated into the local subsystem 10 such that the performance measurement devices automatically generate height/distance/strength messages for transmitting to the control device 30.

In this embodiment, the instructions and other messages transmitted and received via antenna 32 are transmitted using a wireless communication protocol known as Zig-Bee™. Based on the IEEE 802.15 standard, ZigBee specifies high level communication protocols for creating wireless local networks using low powered digital radio systems. ZigBee is useful for creating mesh networks, and is a useful protocol for providing flexibility in implementation of the various components of system 5. A ZigBee coordinator 31 associated with or integrated with controller 30 handles coordination of ZigBee messaging and overall network configuration. In this embodiment, the ZigBee coordinator is embodied in a USB (Universal Serial Bus) "stick" that is plugged into a corresponding USB port in controller 30 for receiving power and transferring network and messaging data to and from controller 30.

In this embodiment, the local subsystem 10 has been configured to run one kind of performance test in the area generally designated as T1, a second kind of performance test in the area generally designated as T2, and a third kind performance test in the area generally designated as T3. The performance tests can be all the same in nature, or can be different. Various configurations would be appropriate for football team tryouts, or for on-field combine exercises, where dozens or hundreds of athletes desire to be tested in various aspects of the sport. Each of the three performance tests can be operated simultaneously, so that at any given moment at least three athletes are being run through performance testing.

In this embodiment, the timing devices TD1 to TD4 are positioned in area T1 in a sequence corresponding to a route the athlete is to traverse during the performance test. In this embodiment, the route for area T1 is a straight line, as might be appropriate for 40-yard dash running speed performance tests. An athlete identifier scanner S1 is also positioned within area T1 adjacent to the start of the route.

Each of timing devices TD1 to TD4 and athlete identifier scanner S1 is associated with a first performance test protocol record stored in a datastore on control device 30. The first performance test protocol record includes fields specifying the number and relative physical locations of the timing devices, the order that the timing devices are expected to be triggered by an athlete when traversing a specified route during the performance test and the unique timing device identifiers associated with a respective position in the order.

Performance test protocol records may be predefined or generated for the purpose of a particular event, and each establish a template for performance test records being generated for each athlete for a given performance test. For example, there may be a performance test protocol record for a dash, a different performance test protocol record for a 3 cone drill, a different performance test protocol record for a shuttle run, and so forth.

In this embodiment, the timing devices TD5 to TD8 are positioned in area T2 in a sequence corresponding to a route the athlete is to traverse during the performance test. In this embodiment, the route for area T2 is also a straight line. Another athlete identifier scanner S2 is also positioned within area T2 adjacent to the start of the route.

Each of timing devices TD5 to TD8 and athlete identifier scanner S2 is associated with a second performance test protocol record stored in the datastore on control device 30. The second performance test protocol record includes fields specifying the number of timing devices, the order that the timing devices are expected to be triggered by an athlete during the performance test, and the unique timing device identifiers associated with a respective position in the order.

In this embodiment, the timing devices TD9 to TD15 are positioned in area T3 in a sequence corresponding to a route the athlete is to traverse during the performance test. In this embodiment, the route for area T3 is a loop, as might be appropriate for an agility performance test. An athlete identifier scanner S3 is also positioned within area T3 adjacent to the start of the route.

Each of timing devices TD9 to TD15 and athlete identifier scanner S3 is associated with a third performance test protocol record stored in a datastore on control device 30. The third performance test protocol record includes fields specifying the number of timing devices, the order that the timing devices are expected to be triggered by an athlete during the performance test, and the unique timing device identifiers associated with a respective position in the order.

Figure 2:
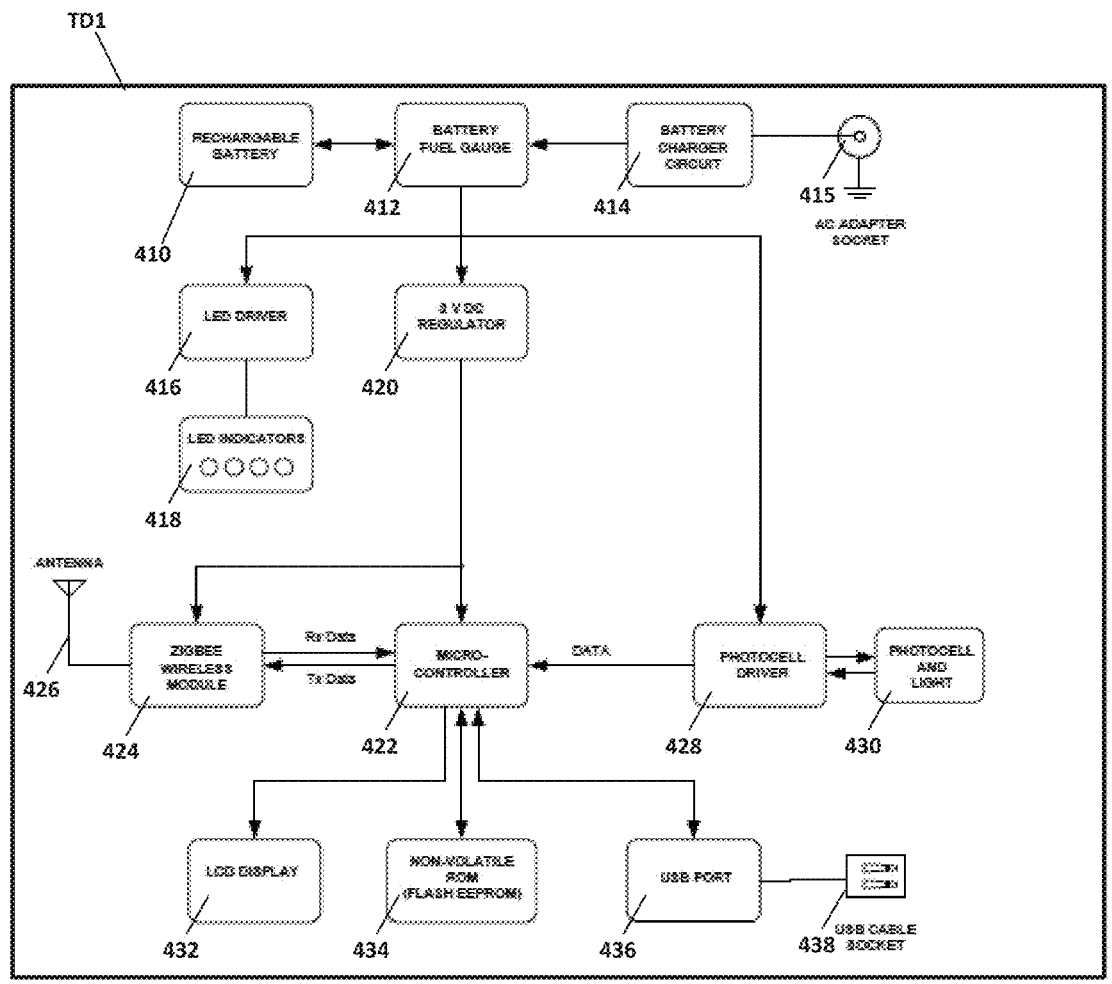
FIG. 2 is a schematic diagram of components of a timing device in the system of FIG. 1, according to an embodiment.

FIG. 2 is a block diagram of components of timing device TD1. Timing devices TD2 through TD15 are, in this embodiment, similarly constructed. In this embodiment, TD1 has an optical trigger subsystem, and a ZigBee-based communication subsystem. TD1 includes a rechargeable battery 410 electrically connected to a battery fuel gauge 412 which, in turn, receives electrical charging power during charging from an alternating current (AC) power source via an AC adapter socket 415 and a battery charger circuit 414. The power from the rechargeable battery 410 is passed through a 3 Volt Direct Current (VDC) regulator for power conditioning prior to reaching other components of the timing device TD1. An LED (light emitting diode) driver 416 drives a number of LED indicators 418 to provide a visual indication to users as to operating characteristics of the timing device TD1. A microcontroller 422 and a ZigBee wireless module 424 of the communication subsystem each receive power from the 3 VDC regulator 420. The optical-type trigger subsystem includes a photocell driver 428 that receives power more directly from rechargeable battery 410.

Microcontroller 422 has onboard system memory, such as a random access memory (RAM) or other dynamic storage device, as well as a crystal clock from which time stamps can be captured and that can be reset during synchronization as will be described. The system memory may be used for storing temporary variables or other intermediate information during the execution of instructions by the microcontroller 422. Microcontroller 422 may include memory structures such as registers for storing such temporary variables or other intermediate information during execution of instructions. Microcontroller 422 is in two-way (receive and transmit) data communications with ZigBee wireless module 424. An antenna 426 stems from the ZigBee wireless module 424.

Microcontroller 422 also receives data from the photocell driver 428, which itself is in two-way communications with a photocell 430 and a light source, in this embodiment a light emitting diode (LED), that are together used to produce and detect a light beam once reflected from a reflector (not shown). Microcontroller 422 also controls an LCD display 432 to display status information, including battery charge status, and is in two-way communications with an USB (Universal Serial Bus) port 436 and corresponding USB cable socket 438. A non-volatile ROM, in this embodiment a Flash EEPROM (Electrically Erasable Programmable Read Only Memory) 434, stores microcontroller-readable program control code for use by microcontroller 422 for operation of timing device TD1. Flash EEPROM also stores a unique timing device identifier, which timing device TD1 incorporates into the electronic time stamp messages it generates. The unique timing device identifier is used by the control device 30 to determine in which field of the performance test record the time data corresponding a given time stamp is to be inserted, as will be described.

Figure 3:
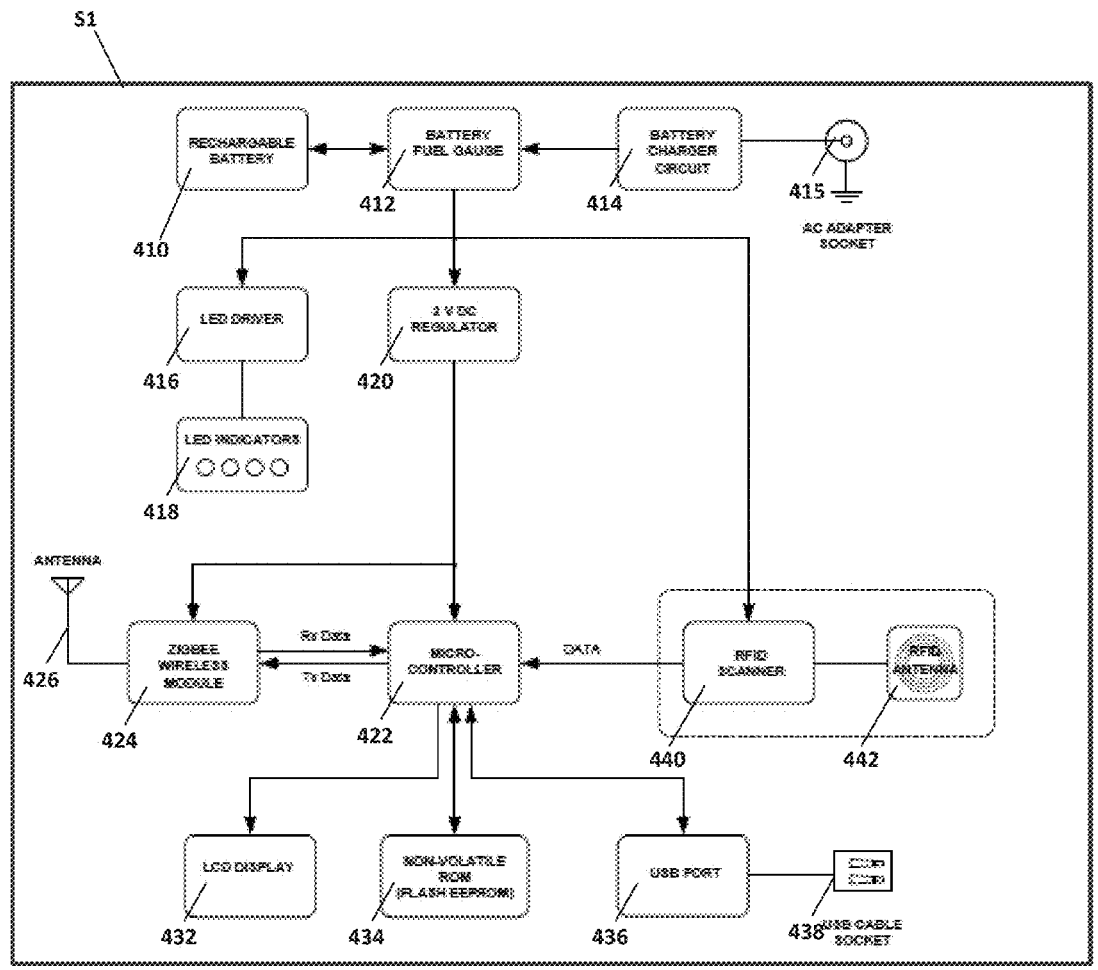
FIG. 3 is a schematic diagram of components of an athlete identifier scanner in the system of FIG. 1, according to an embodiment.

FIG. 3 is a schematic diagram of components of the athlete identifier scanner S1. Athlete identifier scanners S2 and S3 are, in this embodiment, similarly constructed. In this embodiment, athlete identifier scanner S1 is similar in construction to timing device TD1, such that like components are referred to herein using the same reference numerals. Athlete identifier scanner S1 does not have a trigger subsystem as it is not required to generate time stamps during a performance test, but like timing device TD1 it does have a ZigBee-based communication subsystem. In particular, athlete identifier scanner S1 includes a rechargeable battery 410 electrically connected to a battery fuel gauge 412 which, in turn, receives electrical charging power during charging from an alternating current (AC) power source via an AC adapter socket 415 and a battery charger circuit 414. The power from the rechargeable battery 410 is passed through a 3 Volt Direct Current (VDC) regulator for power conditioning prior to reaching other components of the athlete identifier scanner S1. An LED (light emitting diode) driver 416 drives a number of LED indicators 418 to provide a visual indication to users as to operating characteristics of the athlete identifier scanner S1. A microcontroller 422 and a ZigBee wireless module 424 of the communication subsystem each receive power from the 3 VDC regulator 420. An RFID (Radio Frequency ID) scanner 440 receives power more directly from the rechargeable battery 410.

Microcontroller 422 has onboard system memory, such as a random access memory (RAM) or other dynamic storage device, as well as a crystal clock from which time stamps can be captured and that can be reset during synchronization as will be described. The system memory may be used for storing temporary variables or other intermediate information during the execution of instructions by the microcontroller 422. Microcontroller 422 may include memory structures such as registers for storing such temporary variables or other intermediate information during execution of instructions. Microcontroller 422 is in two-way (receive and transmit) data communications with ZigBee wireless module 424. An antenna 426 stems from the ZigBee wireless module 424.

Microcontroller 422 also receives data from the RFID scanner 440, which itself receives electrical signals from an RFID antenna 442 in response to an athlete bringing her RFID bracelet (not shown) close to the RFID antenna 442 causing RFID bracelet to transmit a wireless RFID signal that can be received by RFID antenna 442. Microcontroller 422 also controls an LCD display 432 to display device status information, including battery charge information, and is in two-way communications with an USB (Universal Serial Bus) port 436 and corresponding USB cable socket 438. A non-volatile ROM, in this embodiment a Flash EEPROM (Electrically Erasable Programmable Read Only Memory) 434, stores microcontroller-readable program control code for use by microcontroller 422 for operation of athlete identifier scanner S1. Flash EEPROM also stores a unique scanner identifier, which athlete identifier scanner S1 incorporates into various messages it generates for transmission via ZigBee wireless module 424 and antenna 426 and which can be used by controller 30 to address athlete identifier scanner S1 in particular.

Figure 4:
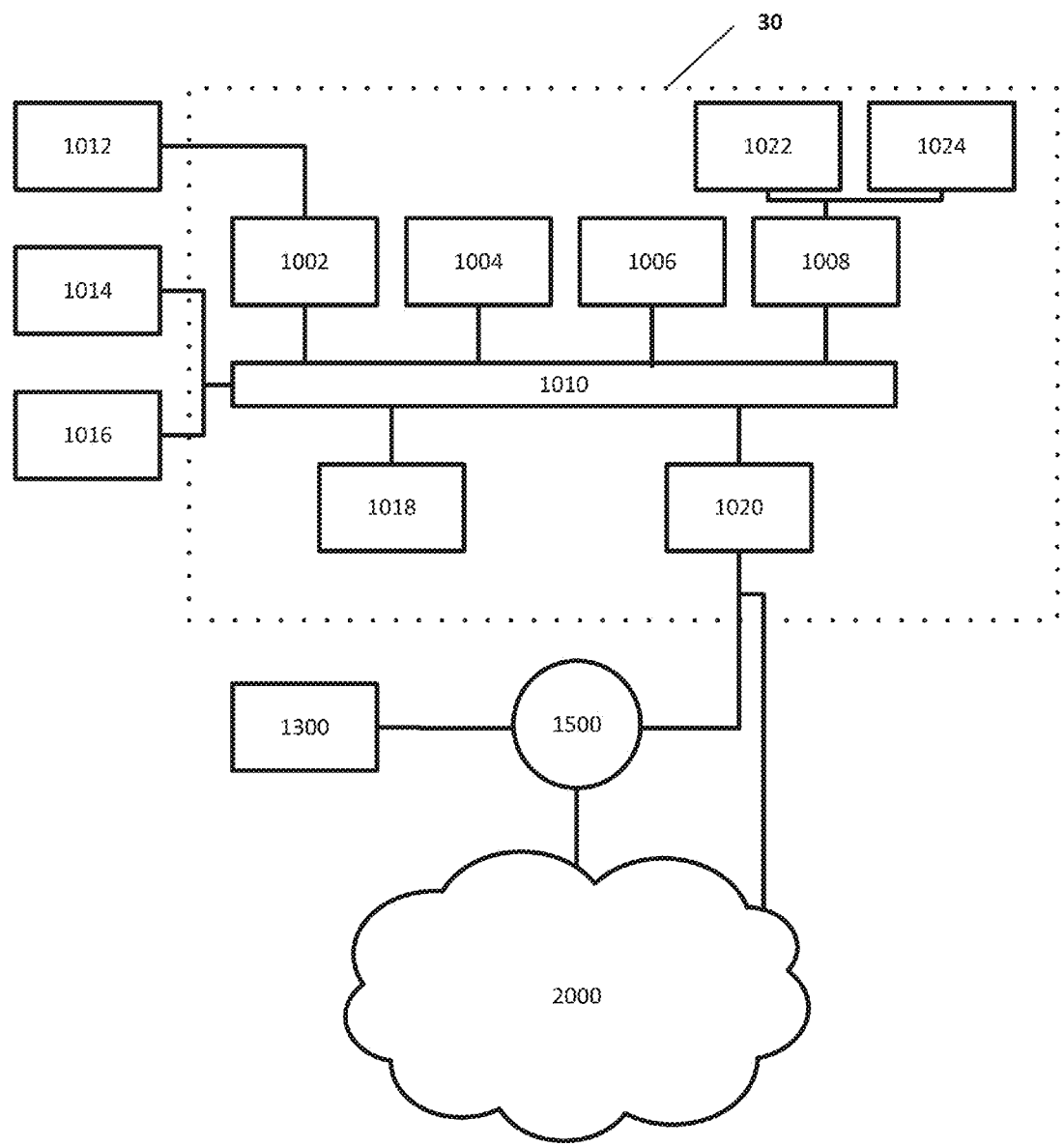
FIG. 4 is a schematic diagram of components of a control device in the system of FIG. 1, according to an embodiment.

FIG. 4 is a schematic diagram of components of the control device 30. In this embodiment, control device 30 includes a bus 1010 or other communication mechanism for communicating information, and a processor 1018 coupled with the bus 1010 for processing the information. The computing system 1000 also includes a main memory 1004, such as a random access memory (RAM) or other dynamic storage device (e.g., dynamic RAM (DRAM), static RAM (SRAM), and synchronous DRAM (SDRAM)), coupled to the bus 1010 for storing information and instructions to be executed by processor 1018. In addition, the main memory 1004 may be used for storing temporary variables or other intermediate information during the execution of instructions by the processor 1018. Processor 1018 may include memory structures such as registers for storing such temporary variables or other intermediate information during execution of instructions. The control device 30 further includes a read only memory (ROM) 1006 or other static storage device (e.g., programmable ROM (PROM), erasable PROM (EPROM), and electrically erasable PROM (EEPROM)) coupled to the bus 1010 for storing static information and instructions for the processor 1018.

The control device 30 also includes a disk controller 1008 coupled to the bus 1010 to control one or more storage devices for storing information and instructions, such as a magnetic hard disk 1022, and a removable media drive 1024 (e.g., floppy disk drive, read-only compact disc drive, read/write compact disc drive, compact disc jukebox, tape drive, and removable magneto-optical drive). The storage devices may be added to the control device 30 using an appropriate device interface (e.g., small computing system interface (SCSI), integrated device electronics (IDE), enhanced-IDE (E-IDE), direct memory access (DMA), or ultra-DMA).

The control device 30 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The control device 30 may also include a display controller 1002 coupled to the bus 1010 to control a display 1012, such as a liquid crystal display (LCD) screen, for displaying information to a computer user. The control device 30 includes input devices, such as a keyboard 1014 and a pointing device 1016, for interacting with a computer user and providing information to the processor 1018. The pointing device 1016, for example, may be a mouse, a trackball, or a pointing stick for communicating direction information and command selections to the processor 1018 and for controlling cursor movement on the display 1012. In addition, a printer may provide printed listings of data stored and/or generated by the computing system 1000.

The control device 30 performs a portion or all of the processing steps in response to the processor 1018 executing one or more sequences of one or more instructions contained in a memory, such as the main memory 1004. Such instructions may be read into the main memory 1004 from another computer readable medium, such as a hard disk 1022 or a removable media drive 1024. One or more processors in a multi-processing arrangement may also be employed to execute the sequences of instructions contained in main memory 1004. In alternative embodiments, hard-wired circuitry may be used in place of or in combination with software instructions. Thus, embodiments are not limited to any specific combination of hardware circuitry and software.

The control device 30 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the control device 30 includes software for controlling the control device 30, for driving a device or devices for implementing the invention, and for enabling the control device 30 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

A computer readable medium providing instructions to a processor 1018 may take many forms, including but not limited to, non-volatile media, volatile media, and transmission media. Non-volatile media includes, for example, optical, magnetic disks, and magneto-optical disks, such as the hard disk 1022 or the removable media drive 1024. Volatile media includes dynamic memory, such as the main memory 1004. Transmission media includes coaxial cables, copper wire and fiber optics, including the wires that make up the bus 1010. Transmission media also may also take the form of acoustic or light waves, such as those generated during radio wave and infrared data communications.

Various forms of computer readable media may be involved in carrying out one or more sequences of one or more instructions to processor 1018 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the control device 30 may receive the data on the telephone line and use an infrared transmitter to convert the data to an infrared signal. An infrared detector coupled to the bus 1010 can receive the data carried in the infrared signal and place the data on the bus 1010. The bus 1010 carries the data to the main memory 1004, from which the processor 1018 retrieves and executes the instructions. The instructions received by the main memory 1004 may optionally be stored on storage device 1022 or 1024 either before or after execution by processor 1018.

The control device 30 also includes a communication interface 1020 coupled to the bus 1010. The communication interface 1020 provides a two-way data communication coupling to a network link that is connected to, for example, a local area network (LAN) 1500, or to the communications network 2000. For example, the communication interface 1020 may be a network interface card to attach to any packet switched LAN. As another example, the communication interface 1020 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1020 sends and receives electrical, electromagnetic or optical signals that carry digital data streams representing various types of information.

The network link typically provides data communication through one or more networks to other data devices. For example, the network link may provide a connection to another computer through a local network 1500 (e.g., a LAN) or through equipment operated by a service provider, which provides communication services through a communications network 2000. The local network 1500 and the communications network 2000 use, for example, electrical, electromagnetic, or optical signals that carry digital data streams, and the associated physical layer (e.g., CAT 5 cable, coaxial cable, optical fiber, etc). The signals through the various networks and the signals on the network link and through the communication interface 1020, which carry the digital data to and from the control device 30, may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The control device 30 can transmit and receive data, including program code, through the network(s) 1500 and 2000, the network link and the communication interface 1020. Moreover, the network link may provide a connection through a LAN 1500 to a mobile device 1300 such as a personal digital assistant (PDA) laptop computer, or cellular telephone.

Alternative configurations of control device 30 may be employed. For example, control device 30 may be implemented in a tablet computer, thus not for example requiring a keyboard 1014, or some other useful configuration.

It will be noted that remote computing subsystem 50 may be configured as a computing device in a similar manner as control device 30, though with computer readable medium embodying program code for providing user access to performance test records and performance test report data via communications network 2000 or via more direct user access to remote computing subsystem 50 through local peripherals or a locally-networked computer. The remote computing subsystem further incorporates computer readable memory storing computer readable program code for providing a protocol development suite for permitting authorized users to create and/or modify performance test protocols as referred to above.

Figure 5:
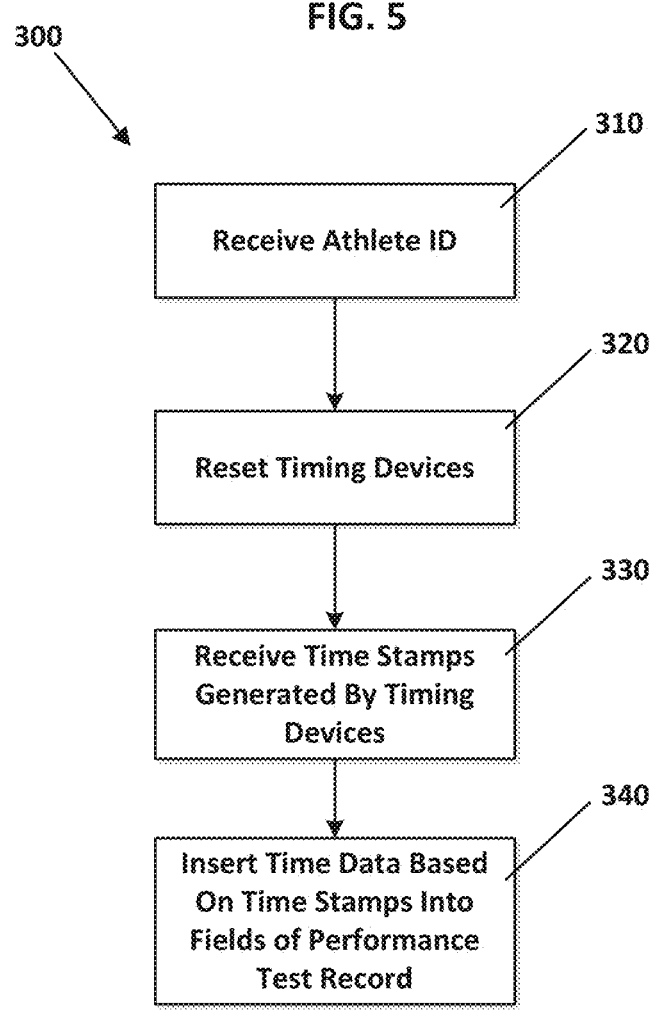
FIG. 5 is a flow chart depicting steps in a computer-implemented process for collecting performance test data, according to an embodiment.

FIG. 5 is a flow chart depicting steps in a computer-implemented process 300 for collecting performance test data, according to an embodiment. In this embodiment, process 300 is implemented on control device 30. Prior to an event to be held at a given location, such as a combines event, athletes can register online for the event using a network connected device such as a desktop computer, a laptop computer, a smart phone, a tablet or other similar device. If the athlete has previously registered for an event administered through remote subsystem 50, then the athlete will have a unique username and password combination that will permit the athlete secure access to an athlete lounge site that can be populated to contain a user profile of the athlete, a photograph, age information and the like. The athlete lounge site also provides the athlete with secure access to his or her prior performance test results, the ability to review reports and/or generate new reports for comparing the athlete to other athletes, and for comparing the athlete's performance on particular performance tests to other athletes' performances on the same performance tests, whether conducted during the same event or during a different event.

If the athlete has not previously registered for an event administered through remote subsystem 50, then upon registering with remote subsystem 50 the athlete will be provided with an unique username and password combination, and be permitted secure access to an athlete lounge site that can be populated to contain a user profile of the athlete, a photograph, age information and the like. Until the athlete has taken part in performance tests administered by remote subsystem 50, then there will be no results to display to the athlete. Data about the athlete entered into remote subsystem 50 is uploaded to control device 30 prior to an event so that local subsystem 10 can recognize the athlete and conduct performance testing during the event without necessarily having to communicate with remote subsystem 50. For example, the expected attendance, and related records and information based on pre-registrations are transferred by the remote computing subsystem 50 to the control device 30 being used to administer the event itself.

Once registered for an event, the athlete can physically attend the event, and can confirm the registration onsite. The athlete may do this by communicating with a site administrator/coach, who can in turn refer to the data that was uploaded to control device 30 to handle confirmations and other administrative activities, or by personal interaction with a terminal that can communicate with control device 30. The system 5 is also capable of handling "walk-up" registrations either to accept new athletes that have not accessed systems before, or to accept athletes that may have accessed systems before but have not previously registered for the event itself.

Confirming registration involves either an automatic or manual process for confirming the athlete's identity, and providing the athlete with his or her own bracelet that incorporates either a passive or an active RFID (Radio Frequency ID) tag storing a unique athlete identifier. It will be understood that other similar identification tags, such as a bracelet or card having a one-dimensional barcode or a two-dimensional barcode such as a QR code, a magnetic-strip card or fob, may similarly be employed. In this embodiment, the identification tag is in the form of a bracelet that is intended to be used by the athlete throughout the event, whether the event is for less than a day, a whole day, or multiple days. During onsite registration, the bracelet is placed proximate to an athlete registration device 60 in order to enable the athlete registration device to wirelessly read the unique athlete identifier from the RFID tag. The unique athlete identifier is thereafter associated with the athlete lounge record for that athlete, and with performance test records that are created either after a performance test or beforehand, thereby to associate the performance test records with the athlete user profile. The bracelet may have additional sensors incorporated within for measuring other information, biometric or otherwise, about the athlete, such as the athlete's heart rate or the readings of an accelerometer incorporated into the bracelet, for use during performance testing.

During process 300, an electronic initiation message is received from an athlete identifier scanner associated with a performance test (step 310). In this embodiment, the electronic initiation message incorporates a unique athlete identifier accepted by the athlete identifier scanner. In response to receiving the electronic initiation message, an electronic reset instruction is automatically transmitted to timing devices associated with the performance test thereby to cause the timing devices to enter a wait state (step 320). During the performance test, the timing devices generate electronic time stamp messages each incorporating a time stamp generated by the timing device once it has entered a triggered state. The electronic time stamp messages are received (step 330), and time data corresponding to the received time stamps is inserted into respective fields of an electronic performance test record associated with the unique athlete identifier (step 340).

In one example, at a time just prior to a performance test at area T1, the athlete brings his or her bracelet proximate to the athlete identifier scanner S1, which wirelessly reads the unique athlete identifier from the RFID tag. The athlete identifier scanner S1 then generates an electronic initiation message incorporating the unique athlete identifier accepted by the athlete identifier scanner, and transmits the electronic initiation message to the control device 30. In response to receiving the electronic initiation message, the control device 30 automatically transmits an electronic reset instruction to timing devices associated with the particular performance test, namely TD1 to TD4, in order to cause the timing devices TD1 to TD4 to enter into a wait state. The reset instruction is broadcast wirelessly via antenna 32, but the reset instruction specifies that only timing devices TD1 to TD4 are to reset. In this way, timing devices TD5 to TD15 in areas T2 and T3 are not affected by that particular reset instruction so that they may continue to operate independently.

After reading the unique athlete identifier from an RFID tag, the athlete identifier scanner S1 waits for a short time, in this embodiment five (5) seconds, before being available to read another (or the same) RFID tag. An administrator/coach overseeing the performance test at area T1 controls when scans of RFID tags may be done by the athlete identifier scanner S1, to ensure that performance test results for one athlete are not allocated to another athlete. After the short time wait, the athlete identifier scanner S1 is available to read another (or the same) RFID tag and to thereby trigger generation of another electronic initiation message as described above.

One benefit of enabling the athlete identifier scanner to be almost immediately available to scan another RFID tag and trigger another electronic initiation message is that an athlete does not have to traverse the entire course (through all of timing devices TD1 to TD4) in order for the next performance test to be initiated and conducted. Thus, for example, if an athlete being tested falls or otherwise fails to complete a performance test, that athlete or another person does not have to traverse the course just to put the system into a condition to conduct the next test. Rather, an entire reset either for that athlete or for the next athlete to be tested can be triggered almost immediately by interaction of an RFID tag with the athlete identifier scanner S1.

In this embodiment, the performance test at area T1 is initiated when a beam of optical radiation emitted by timing device TD1 and reflected back to a receiver of TD1 is broken, as will be described in further detail below. As the athlete traverses the route, the athlete approaches the subsequent timing devices TD2 to TD4 in the sequence. As described, each of the timing devices TD2 to TD4 includes an optical-based trigger subsystem including an emitter for emitting a beam of optical radiation and a receiver for registering receipt of a beam of optical radiation. In this embodiment, the emitter is a light emitting diode (LED), and the receiver is a photocell. A respective reflector is positioned so as to be spaced from each timing device TD2 to TD4, such that the timing device is on one side of the path the athlete is to travel and the reflector is on the other side of the path. The reflector faces the timing device and reflects the beam of optical radiation emitted by the emitter back towards the receiver.

In this embodiment, the timing devices TD1 to TD4 are each configured to be in a respective wait state while its respective beam of optical radiation is initially being received at its receiver, and are each configured to register a trigger condition and enter the triggered state in the event that the beam of optical radiation is broken. As such, when the athlete breaks the beam of optical radiation, the timing devices respectively enter into a triggered state and, while in respective triggered states, generate respective time stamps.

While an athlete is approaching, passing through and leaving the area between each timing device TD1 to TD4 and its respective reflector, it is possible that the athlete's hand, arm or a piece of equipment such as a hockey stick could break the respective beam of optical radiation prior to or after the athlete's body core (i.e., trunk/torso) has broken the beam. It has been discovered that often such "pre-core", "post-core", and core beam breaks can be individually discerned by the timing device. This is based on observations that in many situations each of the breaks are preceded and followed by periods during which the beam is not broken such that each break forms a respective beam ON-OFF-ON profile. For example, an arm might first break the beam, and then a gap between the arm and the core would allow the beam to again be unbroken for a very short time, after which the core might break the beam, and so forth.

Figure 6:
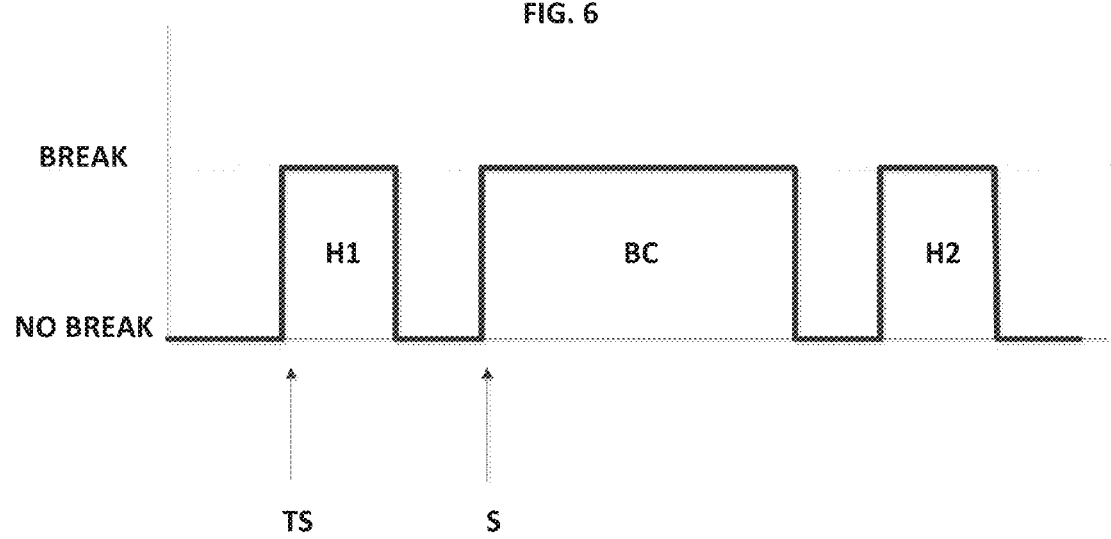
FIG. 6 is a timing diagram showing a pattern of beam breaks observed by a timing device of the system of FIG. 1.

FIG. 6 is a timing diagram showing an exemplary pattern of beam breaks observed by a timing device. As can be seen, when the timing device was in the wait state (in this embodiment, where there has been NO BREAK in the beam), the first BREAK causing the timing device to leave the wait state and enter into the triggered state occurred at time TS and lasted a short time H1. However, subsequent to this short time H1 there was observed another short time during which there was again NO BREAK in the beam. That is, the beam was again unblocked and therefore was able to reach the reflector and be detected reflecting back to the timing device. Pursuant to this, starting at time S, there was another, longer, BREAK period BC. Subsequent to BREAK period BC there was observed another short time during which there was again NO BREAK in the beam. Pursuant to this short time, there was an additional BREAK period H2, after which the beam again had NO BREAK. Based on this observation, in this case it was considered that BREAK periods H1 and H2 were due to an athlete's leading and trailing hands breaking the beam, and BREAK period BC was due to the athlete's body core breaking the beam.

In embodiments, it is possible to treat an entire close succession of such multiple beam breaks for a given timing device as a single large beam break for timing purposes. However, it has been discovered that increased integrity and uniformity in the collection of athletes' timing results may be provided by determining which of the beam breaks in a succession of beam breaks is most likely to be associated with an athlete's body core. In this embodiment, each timing device identifies which in a succession of discernable beam breaks is most likely to be the beam break caused by the athlete's body core by determining which of the beam breaks in the succession is the longest-lasting. In FIG. 2, for example, BREAK period BC was the longest lasting of the break periods H1, BC and H2. BREAK period BC would therefore be considered a beam break caused by the athlete's body core. This is based on an observation that an arm, or some other object typically brought along by an athlete along with his or her body core, is not as wide as the body core and therefore would not generally take as long as the body core to pass between the timing device and its reflector. In this embodiment, upon detection of a first beam break (such as at time TS in FIG. 2), the timing device enters its triggered state but tracks the times of each beam OFF and ON event in any close succession pursuant to the first beam break (for example, 250 or 300 milliseconds or more depending upon the performance test and the desired sensitivity), and then calculates how long each such break lasted. The beam break with the longest span between beam OFF and subsequent beam ON (i.e., the longest break, such as BREAK period BC in FIG. 2) is selected as the longest-lasting beam break. As such, in this embodiment, in the event that there is a processor-discernable succession of beam breaks, each timing device once entering its triggered state thereafter generates its electronic time stamp using only the start time of the longest-lasting beam break in the succession. In the example shown in FIG. 2, the electronic time stamp would be generated using time S in this embodiment, and not time TS.

It has been observed that the longest-lasting beam break in a succession of beam breaks may be the first beam break, the last beam break, or a beam break occurring at some time in the succession between the first and last beam breaks. If only one beam break is detected, the time stamp is simply generated using the start time of the one beam break.

As the performance test is being executed, the timing devices TD1 to TD4 each generate their electronic time stamp message incorporating the generated time stamp and the unique timing device identifier. The electronic time stamp messages are received by the control device 30 and time data corresponding to the received time stamps are automatically inserted into respective fields of the electronic performance test record associated with the unique athlete identifier, in accordance with the performance test protocol.

In this embodiment, the time data entered inserted into the performance test records is generated by the control device 30 by processing the received time stamps. In particular, the time data is generated by subtracting a time stamp corresponding to the start time of the performance test from the other time stamps, thereby to generate elapsed times for each timing device. As such, rather than the time data being, for example, times of day such as: 12:10:0900, 12:10:0990, 12:10:1050, 12:10:1300, the time data processed is: 0.0000, 0.0090, 0.0150, 0.0400. Alternatively, the time data could be generated as elapsed split times. Alternatively, the raw time stamps could simply be inserted into the performance data records, and downstream processing could process the raw time stamps as elapsed and/or split times in order to generate comparisons and reports.

The performance test records may be automatically processed by the control device 30 so as to provide an overall or interim score for the athlete during the event, and for individual comparisons of the athletes on the performance test. Such overall scores and comparison, including rankings, may be incorporated into video data and such video data communicated to a display device 40 such as a video screen displaying a scoreboard for immediate feedback. The display device 40 provides the athletes, coaches, media and other interested parties such as spectators with immediate and up to date feedback as to the performance tests for the various athletes.

The control device 30 provides for manual reset of the athlete identifier scanners S1-S3, as well as the respective timing devices, for enabling a user to manually reset such devices. As such, should there be an error in the administration of a performance test, it is very straightforward to reset the performance test and allow the athlete to begin again by scanning the bracelet and so forth as described above.

In this embodiment, the performance test records for various athletes are maintained on control device 30 during the performance test event. At a later time, an administrator/coach may connect control device 30 to the network 2000 and interact with a user interface element on control device 30 to then trigger the transfer of performance test results on control device 30 along with other data to the remote computing subsystem 50, thereby to synchronize the performance test records stored on the control device 30 with records stored at the remote computing subsystem 50.

Once the performance test records have been synchronized in this way, the remote computing subsystem can process the performance test records to generate various reports, scores, rankings and individualized comparisons with any other performance test records in the remote computing subsystem 50 that were collected on the basis of the same or similar performance test protocols. Furthermore, further processing can be conducted to associate the performance test records with respective athlete profiles, and make the performance test records accessible to authorized parties such as the athletes themselves, coaches and administrators, via such users' network-connected devices such as laptops, tablets, smart phones and the like.

Prior to any event, a coach or other administrator can access the remote computing subsystem 50 to arrange the setup of performance tests to be administered at a given upcoming event. The performance tests to be administered can be based on performance test protocols that are pre-defined, such as universal test protocols that may be devised by a particular sports association or standards group. Such universal test protocols are useful for enabling coaches, athletes, league administrators and the like to compare athletes' performance tests across teams, locations, time and the like. For example, an amateur athlete trying out for a team may wish to compare his or her performance test results to those of a favourite professional athlete who had done the same performance test during a combine a year prior, according to a particular universal protocol. In this way, the amateur athlete can quickly understand the level of performance that is required of a professional-level athlete, and can train accordingly.

The performance tests to be administered can be based on custom test protocols that a coach or administrator would like to devise in order to test particular skills of the athletes. Such custom test protocols would be accessible to the particular coach or administrator who devised the test, for serving as templates for performance tests to be administered to athletes associated with the particular coach or administrator.

The performance test protocols are stored in one or more performance test protocol records on the remote computing subsystem 50, and prior to beginning an event, the control device 30 receives and stores the one or more performance test protocol records from the remote computing subsystem 50, and creates performance test records for the various athletes either prior to the event for being populated with respective time data, or upon administration of each performance test that are structured in accordance with a selected one of the one or more performance test protocol records.

In this embodiment, electronic synchronize instructions are broadcasted by timing device TD1 to all of timing devices TD2 to TD15 and athlete identifier scanners S1 to S3 every 30 seconds in order to ensure that all of these devices are maintaining clocks at times that are exactly the same or at least within an acceptable threshold difference from each other. Without regular synchronizing, the clocks of timing devices TD1 to TD15, being otherwise independent, may drift from each other over the time of an event, even if initially synchronized, due to temperature changes and other environmental factors affecting electronics, and the design and fabrication of the clocks. However, as a result of the regular synchronizing in the manner described herein, any significant time drift attributable to clock drift is effectively filtered before it can be being incorporated into performance test results. It will be understood that other frequencies of synchronizing may be used, such as every minute, every two minutes, and so forth, provided that clock drift that can affect performance test results be kept to an amount that does not substantially affect test result integrity. Selecting the frequency of synchronizing should involve considering the quality and accuracy of the clocks, the clock drift rates, and environmental considerations to the extent that such considerations can affect clock drift rates.

Figure 7:
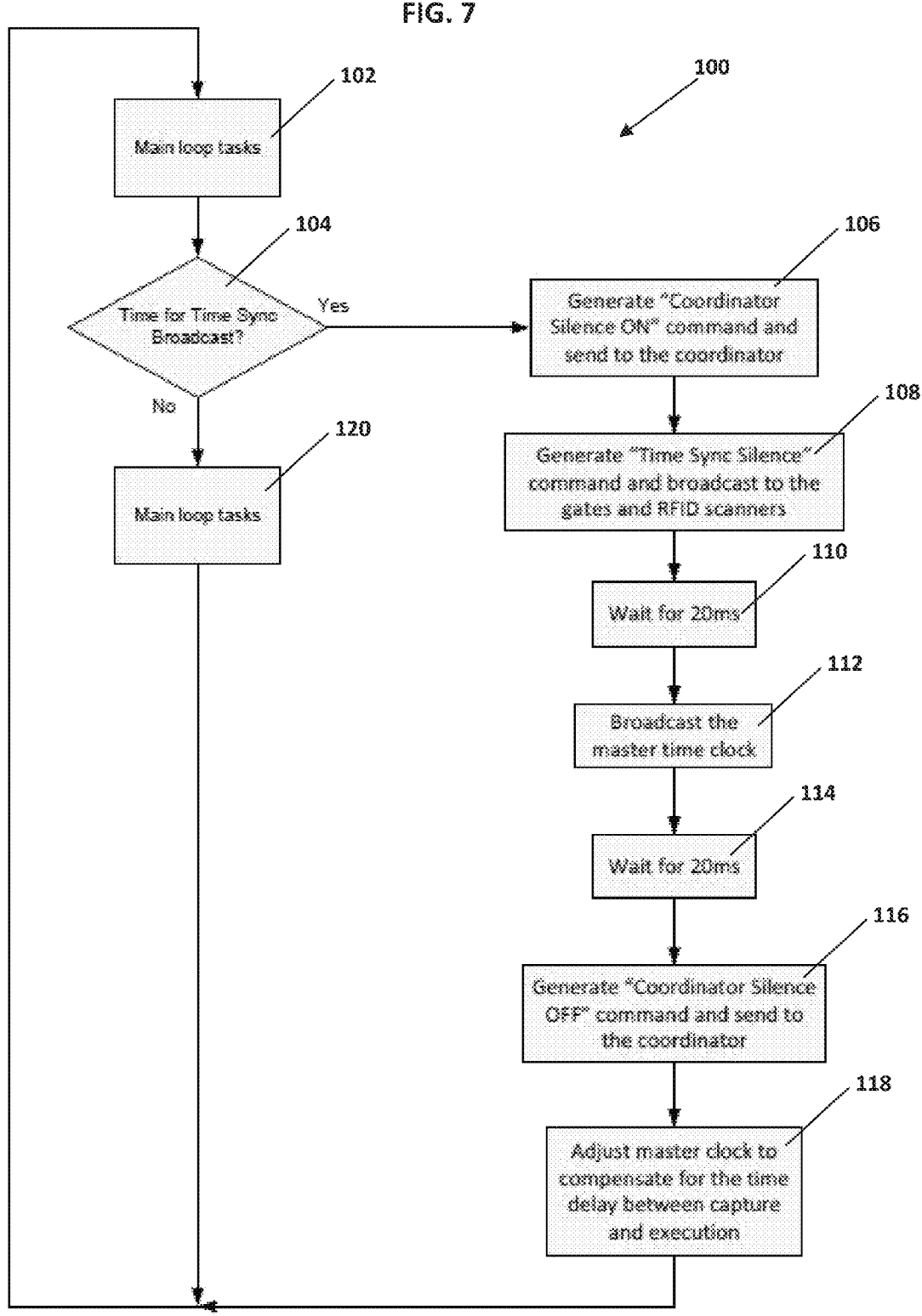
FIG. 7 is a flow diagram depicting steps in a process undertaken by a master device responsible for synchronizing clocks in slave devices of the system of FIG. 1.

FIG. 7 is a flow diagram depicting steps in a process 100 undertaken by a device designated as responsible for synchronizing clocks in devices of local subsystem 10 (the "master"), such as one of the timing devices TD1 to TD15 or athlete identifier scanners S1 to S3. Designation of such a device as the master may be conducted at the time of setup of local subsystem 10 for various performance tests, or at some other time. A device designated as the master for the local subsystem 10 may be later re-designated as a "slave", and another device designated as the master. Designation as a slave device simply means that the slave device is required to accept and act in accordance with instructions from the master device to synchronize its clock to the master device's clock as will be described. A device may be configured as a slave device by default, such that only in the event that it is to be designated a master device or is to be reverted to a slave device is it required to be expressly designated as such. In an embodiment, designation of a device as a master device may automatically cause any other device within the vicinity of local subsystem 10 that had previously been designated a master device to revert to being a slave device. This may be done in the event that a former master device is in need of some repair and is to be taken out of the operation. In this embodiment, management of such designations may be conducted using the control system 10 by broadcasting instructions wirelessly to the various devices in the local subsystem 10. However, in other embodiments, management of such designations may be conducted by more direct interaction with a user interface of the device to be so designated.

For the purpose of the following explanation, in this embodiment timing device TD1 has been designated as the master device whereas timing devices TD2 through TD15, as well as devices S1 through S4 are slave devices. During process 100, the master device conducts its main loop tasks (step 102), including generating electronic time stamp messages as has been described. In the event that the master device determines that it should conduct a time synchronization broadcast (step 104), which in this embodiment is determined when master device determines that 30 seconds has passed since initiating the last such time synchronization broadcast, the master device generates a "Coordinator Silence ON" command and transmits the command to the coordinator 31 (step 106). The purpose of this command is to inform the coordinator 31 that a synchronization process is about to begin and to direct the coordinator 31 to temporarily stop transmitting network communications while synchronization is happening. While coordinator 31 is not transmitting in this condition, coordinator 31 is still able to listen to network communications and direct them to controller 30.

With the "Coordinator Silence ON" command having been transmitted, the master device generates a "Time Sync Silence" command and broadcasts the command for reception by the slave devices (step 108). The operation of each slave device upon receiving this and other commands will be described below with reference to FIG. 8. Returning to FIG. 7, with the "Time Sync Silence" command having been broadcasted at step 108, the master device delays for a first threshold amount of time, in this embodiment twenty (20) milliseconds (ms), (step 110) and then broadcasts a "Time Message" command for reception by the slave devices that incorporates a time stamp of the current time on the internal clock of the master device (step 112). The delay for the first threshold amount of time is done in order to ensure that slave devices have time to complete their last event in progress and to enter complete radio silence. The "Time Message" command serves as the synchronize command. With the "Time Message" command having been broadcasted at step 112, the master device waits for a second threshold amount of time, in this embodiment 20 ms, (step 114) and then transmits a "Coordinator Silence OFF" command to the coordinator 31 (step 116). The purpose of the delay for the second threshold amount of time is to ensure that slave devices have time to complete their respective synchronizations before having to deal with network transmissions.

The purpose of the "Coordinator Silence OFF" command is to instruct the coordinator 31 that the synchronization process is ending and to direct the coordinator 31 that it may resume transmitting network communications. With the "Coordinator Silence OFF" command having been transmitted, the time on the clock of the master device itself is then modified in order to compensate for the duration of time lapsed from the moment the master clock time was captured for the "Time Message" command, until the moment the slave devices executed their respective clock adjustments thereby to synchronize (step 118). That is, at this point in process 100 the clock of the master device (which kept running through the synchronization process) is set back to the time that the master device had incorporated into the "Time Message" command that it had broadcast to the slave devices at step 112.

With the clock of the master device having been adjusted at step 118, process 100 reverts back to step 102 and is repeated each time a synchronization is to be done.

In an alternative embodiment, the first threshold amount of time and the second threshold amount of time may be different amounts than 20 ms, and in such alternative embodiments the first and second threshold amounts of time may be the same or different from each other.

Figure 8:
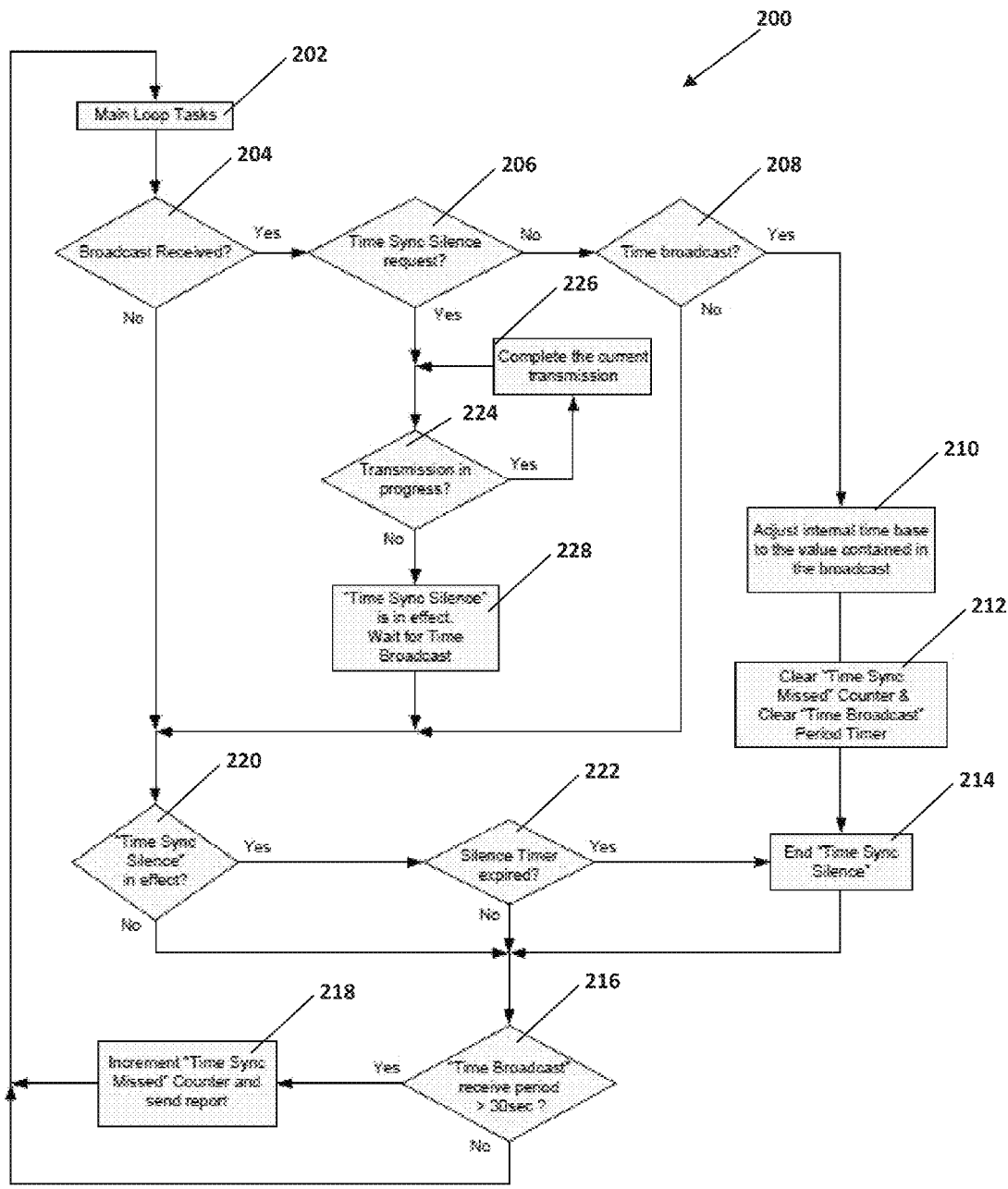
FIG. 8 is a flow diagram depicting steps in a process undertaken by a slave device in connection with synchronization by a master device in the system of FIG. 1.

FIG. 8 is a flow diagram depicting steps in a process 200 undertaken by a device designated as a slave device, such as any one of the timing devices TD1 to TD15 and athlete identifier scanners S1 to S3. For the purpose of the following explanation, in this embodiment timing devices TD2 through TD15, as well as devices S1 through S4 are slave devices. TD1 is the master device. The following is the process 200 undertaken by TD2 as a slave device in this scenario.

During process 200, the slave device conducts its main loop tasks (step 202), the nature of which may be similar to the main loop tasks of other devices such as generating electronic time stamp messages, or which may be different. For example, in this embodiment where timing device TD1 is the master device and timing device TD2 is one of the slave devices, both are timing devices and therefore may have similar or the same main loop tasks.

During conducting its main loop tasks at step 202, slave device determines whether it has received any broadcasted command (step 204). It will be understood that, in this embodiment, a slave device need not know the identity of the master device in order to receive such a command from the master device. In the event that a broadcasted command is received, it is then determined whether the broadcasted command is a "Time Sync Silence" command (step 206). In the event that the broadcasted command is a "Time Sync Silence" command and the slave device is current executing a transmission, as determined at step 224, then the current transmission is completed (step 226). At this time, a Silence Timer is reset to begin counting down from a non-zero time amount to zero.

When the slave device is not executing a transmission, then the slave device enters into a "Time Sync Silence" mode to await a "Time Message" command (step 228). During "Time Sync Silence" mode the slave device does not execute any wireless transmissions, but instead queues such transmissions. However, the slave device does prioritize its main loop tasks and will execute such main loop tasks, such as generating an electronic time stamp message when triggered, in priority to the synchronizing While the "Time Sync Silence" mode is still in effect, as determined at step 220, the slave device determines whether the Silence Timer duration has yet expired (step 222) by referencing the Silence Timer to determine whether it has yet fully counted down to time zero. In the event that the Silence Timer duration has not expired, then it is determined whether more than 30 seconds has passed since a "Time Message" command was last received (step 216). In the event that more than 30 seconds has passed since a "Time Message" command was last received by the slave device, then a "Time Sync Missed" counter is incremented by the slave device, and a "Time Sync Missed" message intended for reception at the controller 30 is queued by the slave device for transmission. The "Time Sync Missed" message incorporates the value of the "Time Sync Missed" counter. The process then simply returns to its main loop tasks at step 202, and is repeated as commands are received. In the event that, at step 216, it is determined that more than 30 seconds has not passed since a "Time Message" command was last received by the slave device, the process simply returns directly to its main loop tasks at step 202, and process 200 is repeated as commands are received.

During processing of the main loop tasks, it is continually determined at step 204 whether a broadcast has been received. While a broadcast has not been received, the process 200 continues to monitor whether the "Time Sync Silence" mode is in effect at step 220 and, if so, continues to determine if the Silence Timer has expired. In the event that it is determined at step 222 that the Silence Timer has expired, then the "Time Sync Silence" mode is ended (step 214) and the process continues from step 216 as described above.

In the event that, at step 206, it is determined that the command is not a "Time Sync Silence" command, it is then determined whether the command is a "Time Message" command (step 208). In the event that the command is a "Time Message" command, the slave device extracts the time stamp incorporated in the "Time Message" command, and replaces its current clock time base with the value of the extracted time stamp (step 210). For example, if the current clock time on the slave device is "05:06:222" and the "Time Message" command incorporates a clock time of "05:06:223", then the slave device clock time is changed/overwritten to "05:06:223" thereby to match the time value incorporated in the "Time Message" command With the internal clock value of the slave device having been adjusted at step 210, the slave device clears an internal "Time Sync Missed" counter by setting its integer value to zero ("0"), and also clears an internal "Time Broadcast" period timer by setting its time value to zero ("00:00:00") (step 212). With the "Time Broadcast" period timer having been zeroed, the "Time Sync Silence" mode is ended (step 214) and the process continues from step 216 as described above.

The synchronization process described above is useful for ameliorating any effects that different or lower quality timing crystals in the devices that are part of local subsystem 10 may otherwise have on accuracy and integrity of performance test results. Furthermore, since timing crystals age with time, prolonged use of a system such as system 5 over a period of many years, and/or introduction of new devices into systems having devices of various ages, can create various non-uniformities in time keeping that can be ameliorated and maintained within acceptable parameters with the use of synchronizing as described above. For example, with timing crystals having +/−10 part-per-million (ppm) initial accuracy, it is common for there to be a +/−3 ppm drift in accuracy per year due to crystal aging. In other words, a +/−10 ppm crystal will have the same accuracy performance as a +/−13 ppm crystal at the end of its first year. This translates to a +/−3 microsecond drift every second for each year of aging, which amounts to +/−90 microseconds' drift every 30 seconds. For a system with +/−10 ppm crystals to stay within +/−2.5 ms (2500 microseconds) to achieve +/−5.0 ms accuracy, it will be approximately 24.5 years before the crystal aging becomes a concern. However, using lower quality crystals, accounting for missed Time Message commands, or requiring higher tolerances can drastically reduce the life span within which crystals can provide the required uniformities.

In an embodiment employing 10 ppm oscillator crystals in timing devices and other devices, it has been determined that +/−5.0 ms accuracy operating range with time measurements can be maintained with 30 second, or more frequent, synchronization intervals. However, for lower tolerance accuracy, such as +/−1.0 ms accuracy, higher-quality oscillator crystals and/or more frequent synchronization will be required. Similarly, if higher tolerance accuracy is permissible, such as +/−10 ms accuracy, lower-quality oscillator crystals and/or less frequent synchronization may be employed.

Although embodiments have been described with reference to the drawings, those of skill in the art will appreciate that variations and modifications may be made without departing from the spirit and scope thereof as defined by the appended claims.

While implementing wireless transmission by broadcast of various messages and instructions such as electronic reset instructions, electronic synchronize instructions, electronic time stamp messages and the like is particularly useful for ease and tidiness of system setup, other implementations are possible. For example, the timing devices for a particular test such as test T1 could be physically wired to each other such that their electronic communications are transferred by wire. Similarly, control device 30 could be physically wired to various timing devices and athlete identifier scanner such that electronic communications to and from timing devices and the athlete identifier scanner could be done via wire rather than wirelessly.

In another embodiment, one or more timing devices are configured to be in a wait state while the beam of optical radiation is not being received at the receiver, and is configured to enter the triggered state in the event that the beam of optical radiation is received at the receiver. Timing devices configured in such a manner to enable testing of reaction time, or permit start of a performance test to occur as soon as the athlete leaves a particular physical location in which the athlete was blocking the beam, thereby to unblock the beam.

Figure 9:
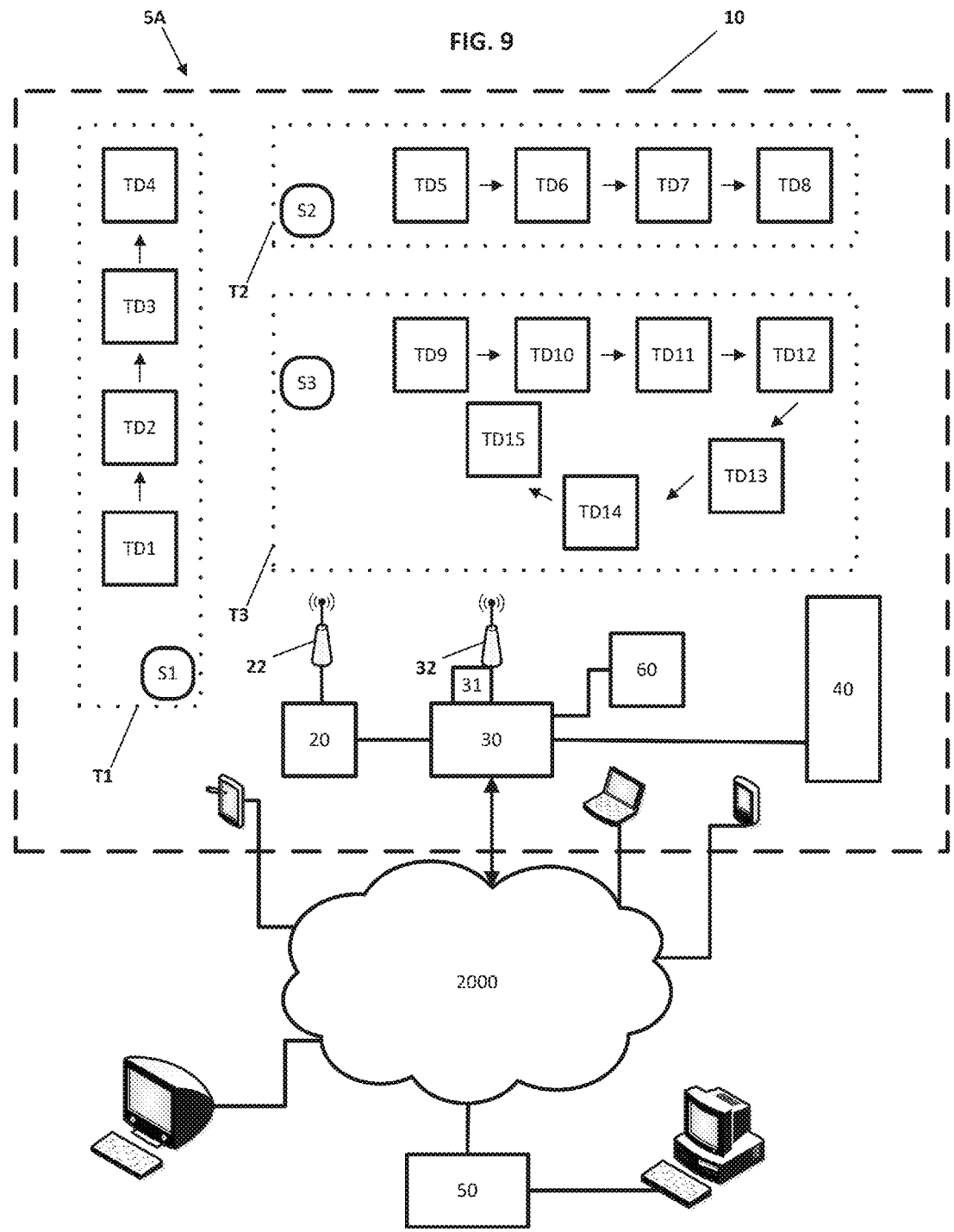
FIG. 9 is a schematic diagram of a system for collecting performance test data, according to an alternative embodiment.

While embodiments have been described in which the synchronizing device is a particular designated one of the timing devices, in an alternative embodiment the synchronizing device may be a separate device configured to periodically transmit electronic synchronize instructions to timing devices TD1 through TD15 as well as other system devices. FIG. 9 is a schematic diagram of an alternative system 5A for collecting performance test data according to an embodiment. System 5A is very similar to system 5 shown in FIG. 1, except that it includes a synchronizing device 20 that is associated with control device 30 and separate from any timing devices, and that is configured to periodically transmit electronic synchronize instructions via antenna 22 to the timing devices TD1 to TD15 as well as other system devices in order to ensure that timing devices TD1 to TD15 and such other devices remain synchronized with each other. In yet another alternative embodiment, synchronizing functionality described herein may be provided via control device 30, and employing a clock on the control device 30, such that electronic synchronizing instructions are broadcast via antenna 32. Alternatively, the synchronizing functionality described herein may be incorporated into one of the other devices in the system that is within the vicinity of devices to be synchronized.

While embodiments have been described in which the synchronizing device broadcasts an electronic synchronize instruction that incorporates the time of the master clock of the synchronizing device, alternative synchronize instruction schemes are possible. For example, the synchronizing device could periodically broadcast an electronic synchronize instruction that does not incorporate any time, but that requires the timing devices to reset their internal clocks to an elapsed time of zero (0.000) rather than a particular time of day.

Various embodiments involving timing devices having stimulus components that provide stimuli to the athletes during a particular performance test could be incorporated into the system 5, such as devices that provide visible or audible stimuli to the athlete at a particular point in their performance test. For example, the control device 30 may instruct such a stimulus component to instruct the athlete to move left or right at a particular waypoint, thus testing reaction speed and agility.

In alternative implementations, other suitable wireless protocols implemented by control device 30 and the communications subsystem of various devices such as timing devices TD1 through TD15 and athlete identifier scanners S1 to S3 may be employed, such as for example Bluetooth, Wi-Fi, ANT, IEEE 802.15.4, and Z-Wave, for broadcasting of electronic synchronize instructions as has been described, or for both.

While the trigger subsystem of the timing devices TD1 through TD15 has been described as an optical trigger subsystem, alternatives are possible. For example, a trigger subsystem could be comprises of a touch-based trigger mechanism. For sports performance testing, it is generally preferable to have a trigger subsystem that is highly responsive as well as reliable.

Embodiments have been described in which local subsystem 10 and remote subsystem 50 do not have to be in communication with each other while local subsystem 10 is being used to conduct performance tests during an event. One benefit of this approach is that a local subsystem 10 can be fully functional for conducting performance tests in a remote location such as a soccer field or at an ice rink where an Internet connection is not available. However, embodiments may be provided in which local subsystem 10 and remote subsystem 50 do intermittently or regularly communicate during a performance testing event.

What is claimed is:

1. A system for collecting performance test data, the system comprising:
   a plurality of timing devices each configured to generate one or more electronic time stamp messages each incorporating a time stamp generated in response to entering into a triggered state during a performance test;
   a synchronizing device incorporated into one or more of the timing devices, said synchronizing device being configured to periodically transmit electronic synchronize instructions to the timing devices to synchronize the timing devices; and
   a control device configured to receive the electronic time stamp messages from the timing devices and to insert time data corresponding to the time stamps into respective fields of performance test records.

2. The system of claim 1, further comprising:
a remote computing subsystem configured to receive and store performance test records from the control device.

3. The system of claim 2, wherein the control device is configured to store performance test protocols received from the remote computing device, wherein performance test records are structured according to respective performance test protocols.

4. The system of claim 1, wherein the timing devices prioritize generating the one or more electronic time stamp messages over handling of the synchronize instructions.

5. The system of claim 1, wherein the control device is configured to transmit an electronic reset instruction to the timing devices thereby to cause the timing devices to leave the triggered state and enter into a wait state.

6. The system of claim 1, comprising:
an athlete identifier scanner associated with the performance test and configured to accept unique athlete identifiers and to transmit electronic initiation messages each incorporating a unique athlete identifier to the control device.

7. The system of claim 6, comprising:
an athlete registration device associated with the control device and configured to accept the unique athlete identifier and to transmit electronic registration messages each incorporating a unique athlete identifier to the control device upon athlete registration,
wherein the control device is configured to associate performance test records with an athlete information record associated with a unique athlete identifier.

8. A timing device for a performance test system, the timing device comprising:
an optical-type trigger subsystem that includes an emitter for emitting a beam of optical radiation and a receiver for registering receipt of a beam of optical radiation, wherein a reflector reflects a beam of optical radiation emitted by the emitter towards the receiver across a path to be traversed by an athlete during a performance test;
a clock;
processing structure associated with the trigger subsystem entering into a triggered state and generating one or more electronic time stamp messages each incorporating a time stamp of the clock in response to the trigger subsystem detecting a trigger condition; and
a communication subsystem responsive to the processing structure for transmitting the one or more electronic time stamp messages.

9. The timing device of claim 8, wherein the processing structure is configured to periodically transmit electronic synchronize instructions to synchronize devices in the performance test system to the clock.

10. The timing device of claim 8, wherein the processing structure is configured to receive periodic electronic synchronize instructions and to, in response, synchronize the clock in accordance with the instructions.

11. The timing device of claim 8, wherein the trigger subsystem is configured to transition from a wait state to the triggered state in response to an initial break in receipt of the beam of optical radiation by the receiver, wherein the processing structure is configured to discern between individual breaks in a succession of breaks in receipt of the beam of optical radiation, wherein the processing structure is configured to establish the time stamp using the start time of the longest-lasting of the individual breaks in the event of a succession of breaks in receipt of the beam of optical radiation.

12. A system for collecting performance test data, the system comprising:
a plurality of timing devices each configured to generate one or more electronic time stamp messages each incorporating a time stamp generated in response to entering into a triggered state during a performance test;
a synchronizing device configured to periodically transmit electronic synchronize instructions to the timing devices to synchronize the timing devices, wherein the timing devices prioritize generating the one or more electronic time stamp messages over handling of the synchronize instructions; and
a control device configured to receive the electronic time stamp messages from the timing devices and to insert time data corresponding to the time stamps into respective fields of performance test records.

13. The system of claim 12, further comprising:
a remote computing subsystem configured to receive and store performance test records from the control device.

14. The system of claim 13, wherein the control device is configured to store performance test protocols received from the remote computing device, wherein performance test records are structured according to respective performance test protocols.

15. The system of claim 12, wherein the synchronizing device is incorporated into one or more of the timing devices.

16. The system of claim 12, wherein the control device is configured to transmit an electronic reset instruction to the timing devices thereby to cause the timing devices to leave the triggered state and enter into a wait state.

17. The system of claim 12, comprising:
an athlete identifier scanner associated with the performance test and configured to accept unique athlete identifiers and to transmit electronic initiation messages each incorporating a unique athlete identifier to the control device.

18. The system of claim 17, comprising:
an athlete registration device associated with the control device and configured to accept the unique athlete identifier and to transmit electronic registration messages each incorporating a unique athlete identifier to the control device upon athlete registration,
wherein the control device is configured to associate performance test records with an athlete information record associated with a unique athlete identifier.

19. A system for collecting performance test data, the system comprising:
a plurality of timing devices each configured to generate one or more electronic time stamp messages each incorporating a time stamp generated in response to entering into a triggered state during a performance test;
a synchronizing device configured to periodically transmit electronic synchronize instructions to the timing devices to synchronize the timing devices; and
a control device configured to receive the electronic time stamp messages from the timing devices and to insert time data corresponding to the time stamps into respective fields of performance test records, wherein the control device is configured to transmit an electronic reset instruction to the timing devices thereby to cause the timing devices to leave the triggered state and enter into a wait state.

20. The system of claim 19, further comprising:
a remote computing subsystem configured to receive and store performance test records from the control device.

21. The system of claim 20, wherein the control device is configured to store performance test protocols received from the remote computing device, wherein performance test records are structured according to respective performance test protocols.

22. The system of claim 19, wherein the synchronizing device is incorporated into one or more of the timing devices.

23. The system of claim 19, wherein the timing devices prioritize generating the one or more electronic time stamp messages over handling of the synchronize instructions.

24. The system of claim 19, comprising:
an athlete identifier scanner associated with the performance test and configured to accept unique athlete identifiers and to transmit electronic initiation messages each incorporating a unique athlete identifier to the control device.

25. The system of claim 24, comprising:
an athlete registration device associated with the control device and configured to accept the unique athlete identifier and to transmit electronic registration messages each incorporating a unique athlete identifier to the control device upon athlete registration,
wherein the control device is configured to associate performance test records with an athlete information record associated with a unique athlete identifier.

* * * * *